US007069556B2

(12) United States Patent
Shah et al.

(10) Patent No.: US 7,069,556 B2
(45) Date of Patent: Jun. 27, 2006

(54) METHOD AND APPARATUS FOR IMPLEMENTING A PARALLEL CONSTRUCT COMPRISED OF A SINGLE TASK

(75) Inventors: Sanjiv M. Shah, Champaign, IL (US); Paul M. Petersen, Champaign, IL (US)

(73) Assignee: Intel Corporation, Santa Clara, CA (US)

( * ) Notice: Subject to any disclaimer, the term of this patent is extended or adjusted under 35 U.S.C. 154(b) by 843 days.

(21) Appl. No.: 09/964,950

(22) Filed: Sep. 27, 2001

(65) Prior Publication Data

US 2003/0061255 A1    Mar. 27, 2003

(51) Int. Cl.
*G06F 9/46* (2006.01)

(52) U.S. Cl. ...................... 718/102; 718/100
(58) Field of Classification Search ......... 718/100–108
See application file for complete search history.

(56) References Cited

U.S. PATENT DOCUMENTS

| 5,345,588 | A | * | 9/1994 | Greenwood et al. | ......... 718/107 |
| 5,511,192 | A | * | 4/1996 | Shirakihara | ................. 718/106 |
| 5,535,393 | A | * | 7/1996 | Reeve et al. | ................ 717/149 |
| 5,812,852 | A | * | 9/1998 | Poulsen et al. | ............ 717/149 |
| 6,286,130 | B1 | * | 9/2001 | Poulsen et al. | ............ 717/119 |
| 6,799,194 | B1 | * | 9/2004 | Grosz et al. | ................ 708/446 |
| 6,832,378 | B1 | * | 12/2004 | Beatty et al. | ............... 718/104 |
| 2002/0062478 | A1 | * | 5/2002 | Ishikawa et al. | ............ 717/149 |
| 2002/0078125 | A1 | * | 6/2002 | Ichinose et al. | ............ 709/107 |
| 2002/0087813 | A1 | * | 7/2002 | Harris et al. | ................ 711/148 |
| 2003/0066056 | A1 | * | 4/2003 | Petersen et al. | ............ 717/137 |

FOREIGN PATENT DOCUMENTS

EP            400328 A1 * 12/1990

OTHER PUBLICATIONS

IBM Technical Disclosure Bulletin. "Synchronization Constructs for Parallel Fortran." Feb. 1, 1987.*

(Continued)

*Primary Examiner*—Lewis A. Bullock, Jr.
(74) *Attorney, Agent, or Firm*—Blakely, Sokoloff, Taylor & Zafman LLP (57) ABSTRACT

A method and apparatus for implementing a parallel construct comprised of a single task is described. A method comprises receiving a first code segment, the first code segment having a set of instances of a parallel construct, each of the set of instances of the parallel construct comprised of a task, and translating the first code segment to a second code segment, the second code segment, when being executed to perform operations comprising: allocating a shared value, the shared value to indicate a most current one of the set of instances encountered by one of a team of threads, allocating a private value for each of the team of threads, the private value to indicate one of the set of instances encountered by the private value's corresponding thread of the team of threads, maintaining the shared value with the team of threads, and maintaining the private value of each of the team of threads with the private value's corresponding thread of the team of threads.

12 Claims, 7 Drawing Sheets

OTHER PUBLICATIONS

IBM Technical Disclosure Bulletin. "Method of Managing Main Storage Areas that are Shared Hierarchically by Threads." Jan. 1994.*

Aho, Alfred et al. Compilers, Principles, Techniques, and Tools. Addison-Wesley series in Computer Science. 1986. pp. 4-5 and 16-19.*

IBM Technical Disclosure Bulletin. "Method of Managing Main Strage Areas that are Shared Hierarchically by Threads." Jan. 1994.*

OpenMP C and C++ Application Program Interface Version 1.0, Open MP Document Review Board, Document No. 004-2229-001, Oct. 1998, 82 pages.

* cited by examiner

METHOD AND APPARATUS FOR IMPLEMENTING A PARALLEL CONSTRUCT COMPRISED OF A SINGLE TASK

BACKGROUND OF THE INVENTION

1. Field of the Invention

The invention relates to the field of computer processing. More specifically, the invention relates to a method and apparatus of parallel computation.

2. Background of the Invention

Parallel computing of tasks achieves faster execution and/or enables the performance of complex tasks that single processor systems cannot perform. One paradigm for performing parallel computing is shared-memory programming. The OpenMP specifications are an agreed upon industry standard for programming shared memory architectures.

OpenMP provides various work sharing constructs for parallelization of programs with teams of threads. OpenMP requires all threads of a team to execute all worksharing and barrier constructs in the same order. OpenMP provides for three kinds of work sharing constructs for parallel execution of implicitly sequential code. One of these work sharing constructs is the SINGLE construct. The SINGLE construct is used to specify a single task for execution by one of a team of threads. The SINGLE construct with the NOWAIT variant can be used to parallelize irregular pieces of code since the rest of the team is not required to wait until the task is finished.

Although OpenMP outlines requirements for constructs and provides guidelines for parallel programming, implementation of the work sharing constructs are not detailed. Current and past implementation of the SINGLE construct allocates an object for each instance of the SINGLE construct occurring in a program. The first thread to arrive at an instance of the SINGLE construct creates the object as a global data structure allocated from the heap. The object is maintained until the last thread arrives at the instance of the SINGLE construct. Each thread examines the object to determine if it should perform the task associated with the instance of the SINGLE construct. Each thread must go through a lock acquisition phase to examine the object. The last thread to arrive clears the object.

This implementation of the SINGLE construct is inefficient. Performance is inefficient because each thread must go through a lock acquisition phase for each instance of the SINGLE construct. In addition, memory is utilized inefficiently because of the persisting objects created for each instance.

Despite the inefficiencies of this implementation, the implementation persists since the SINGLE construct is used to turn off parallelization. Moreover, efficiency of the implementation language for the SINGLE construct for parallel computing has not been given much thought since parallel programs using SINGLE constructs were limited to specific applications.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention. Although embodiments of the invention are described with reference to a SINGLE construct, the described invention can be applied to any parallel construct with the following attributes: 1) all threads of a team must execute the parallel construct in the same order; 2) the parallel construct is comprised of a single task; and 3) the first thread to encounter the parallel construct can execute the associated task.

Figure 1:
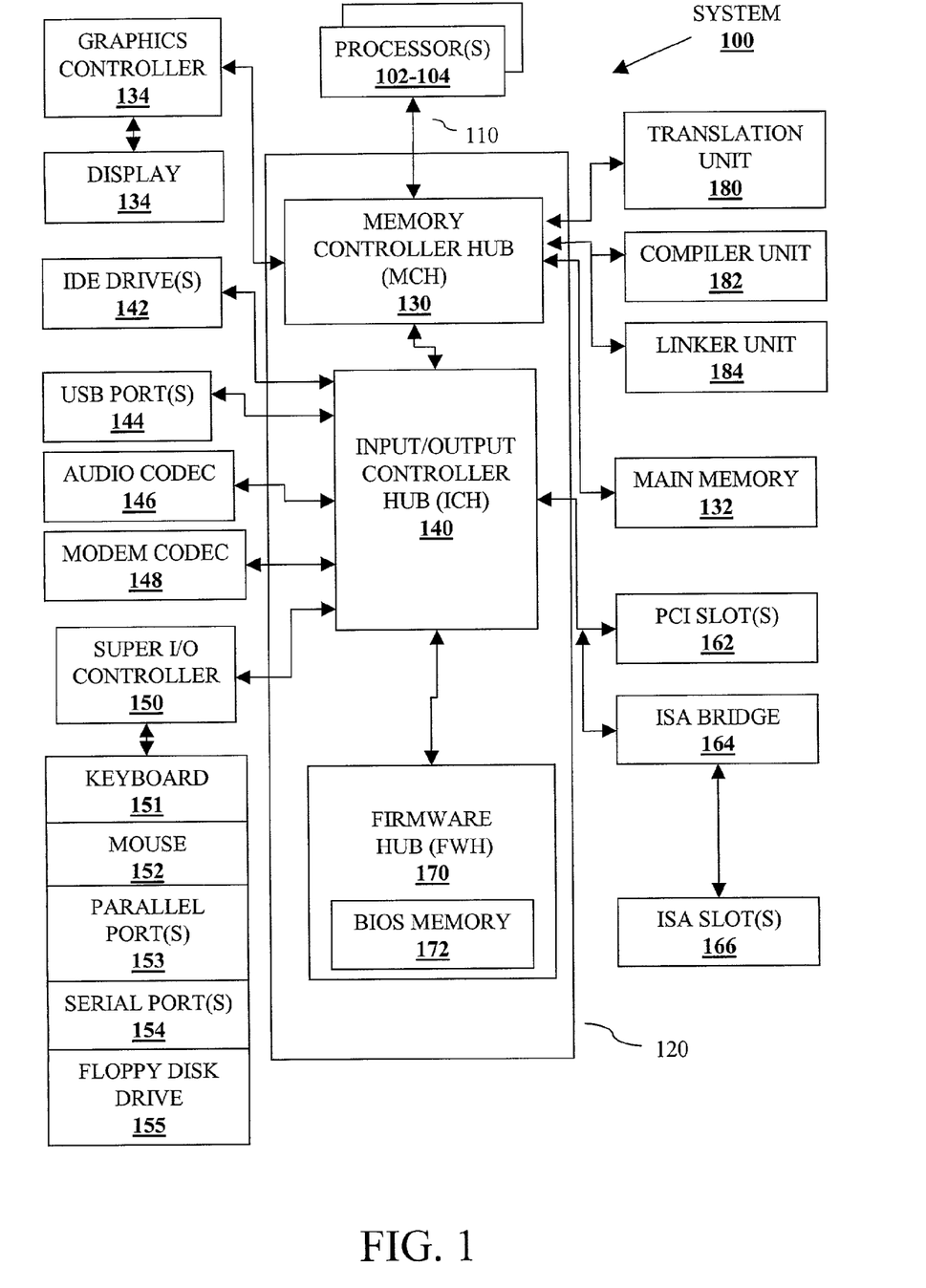
FIG. 1 illustrates an exemplary system 100 comprising processors 102 and 104 for execution of parallel constructs comprising a single task, according to embodiments of the present invention.

FIG. 1 illustrates an exemplary system 100 comprising processors 102 and 104 for execution of parallel constructs comprising a single task, according to embodiments of the present invention. Although described in the context of system 100, the present invention may be implemented in any suitable computer system comprising any suitable one or more integrated circuits.

As illustrated in FIG. 1, computer system 100 comprises processor 102 and processor 104. Computer system 100 also includes processor bus 110, and chipset 120. Processors 102 and 104 and chipset 120 are coupled to processor bus 110. Processors 102 and 104 may each comprise any suitable processor architecture and for one embodiment comprise an Intel® Architecture used, for example, in the Pentium® family of processors available from Intel® Corporation of Santa Clara, Calif. Computer system 100 for other embodiments may comprise one, three, or more processors any of which may execute a set of instructions that are in accordance with embodiments of the present invention.

Chipset 120 for one embodiment comprises memory controller hub (MCH) 130, input/output (I/O) controller hub (ICH) 140, and firmware hub (FWH) 170. MCH 130, ICH 140, and FWH 170 may each comprise any suitable circuitry and for one embodiment is each formed as a separate integrated circuit chip. Chipset 120 for other embodiments may comprise any suitable one or more integrated circuit devices.

MCH 130 may comprise any suitable interface controllers to provide for any suitable communication link to processor bus 110 and/or to any suitable device or component in communication with MCH 130. MCH 130 for one embodiment provides suitable arbitration, buffering, and coherency management for each interface.

MCH 130 is coupled to processor bus 110 and provides an interface to processors 102 and 104 over processor bus 110. Processor 102 and/or processor 104 may alternatively be combined with MCH 130 to form a single chip. MCH 130 for one embodiment also provides an interface to a main memory 132 and a graphics controller 134 each coupled to MCH 130. Main memory 132 stores data and/or instructions, for example, for computer system 100 and may comprise any suitable memory, such as a dynamic random access memory (DRAM) for example. Graphics controller 134 controls the display of information on a suitable display 136, such as a cathode ray tube (CRT) or liquid crystal display (LCD) for example, coupled to graphics controller 134. MCH 130 for one embodiment interfaces with graphics controller 134 through an accelerated graphics port (AGP). Graphics controller 134 for one embodiment may alternatively be combined with MCH 130 to form a single chip.

For one embodiment, ICH 140 provides an interface to one or more suitable integrated drive electronics (IDE) drives 142, such as a hard disk drive (HDD) or compact disc read only memory (CD ROM) drive for example, to store data and/or instructions for example, one or more suitable universal serial bus (USB) devices through one or more USB ports 144, an audio coder/decoder (codec) 146, and a modem codec 148. ICH 140 for one embodiment also provides an interface through a super I/O controller 150 to a keyboard 151, a mouse 152, one or more suitable devices, such as a printer for example, through one or more parallel ports 153, one or more suitable devices through one or more serial ports 154, and a floppy disk drive 155. ICH 140 for one embodiment further provides an interface to one or more suitable peripheral component interconnect (PCI) devices coupled to ICH 140 through one or more PCI slots 162 on a PCI bus and an interface to one or more suitable industry standard architecture (ISA) devices coupled to ICH 140 by the PCI bus through an ISA bridge 164. ISA bridge 164 interfaces with one or more ISA devices through one or more ISA slots 166 on an ISA bus.

ICH 140 is also coupled to FWH 170 to provide an interface to FWH 170. FWH 170 may comprise any suitable interface controller to provide for any suitable communication link to ICH 140. FWH 170 for one embodiment may share at least a portion of the interface between ICH 140 and super I/O controller 150. FWH 170 comprises a basic input/output system (BIOS) memory 172 to store suitable system and/or video BIOS software. BIOS memory 172 may comprise any suitable non-volatile memory, such as a flash memory for example.

Additionally, computer system 100 includes translation unit 180, compiler unit 182 and linker unit 184. In an embodiment, translation unit 180, compiler unit 182 and linker unit 184 can be processes or tasks that can reside within main memory 132 and/or processors 102 and 104 and can be executed within processors 102 and 104. However, embodiments of the present invention are not so limited, as translation unit 180, compiler unit 182 and linker unit 184 can be different types of hardware (such as digital logic) executing the processing described herein (which is described in more detail below).

Accordingly, computer system 100 includes a machine-readable medium on which is stored a set of instructions (i.e., software) embodying any one, or all, of the methodologies to be described below. For example, software can reside, completely or at least partially, within main memory 132 and/or within processors 102/104. For the purposes of this specification, the term "machine-readable medium" shall be taken to include any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices, etc.

Figure 2:
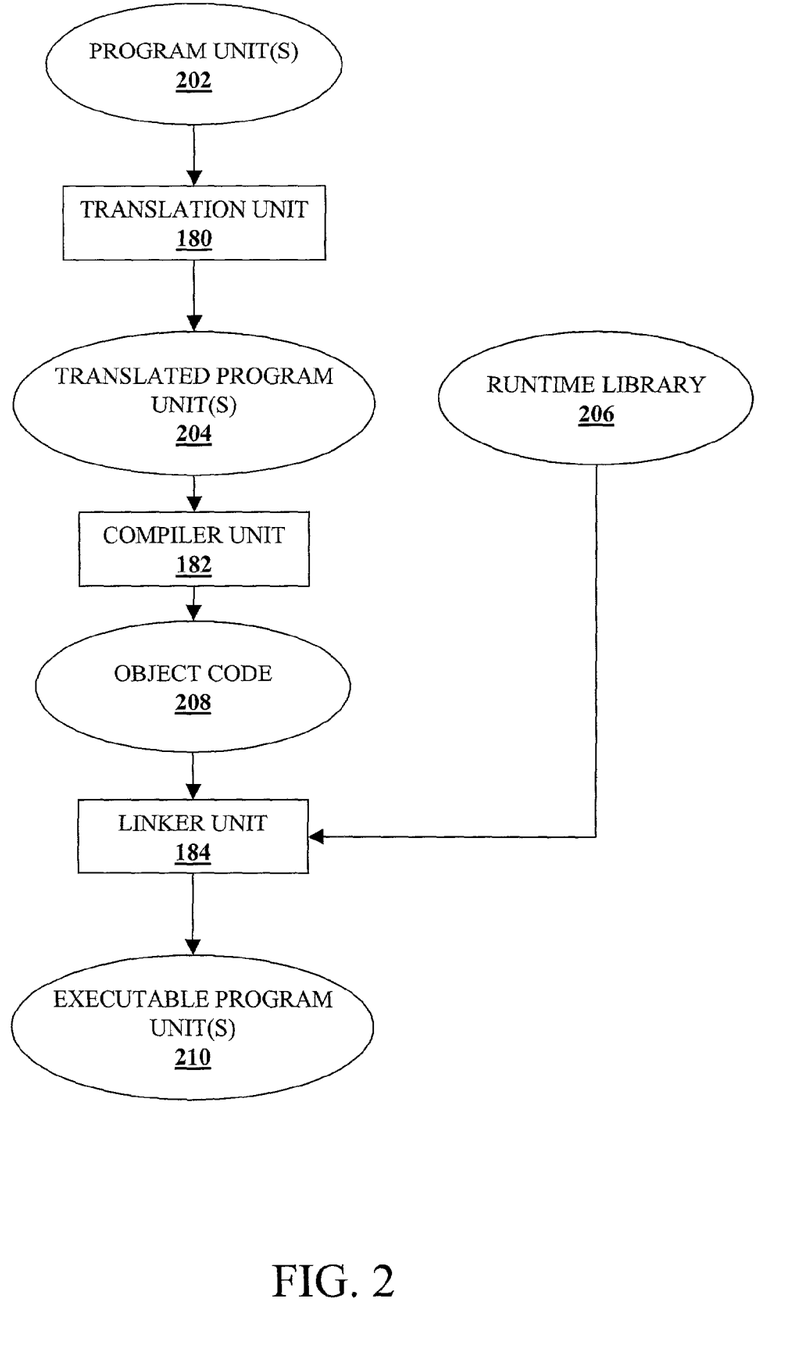
FIG. 2 illustrates a data flow diagram for generation of a number of executable program units that include parallel constructs according to one embodiment of the invention.

FIG. 2 illustrates a data flow diagram for generation of a number of executable program units that include parallel programs with instances of a parallel construct according to one embodiment of the invention. As shown, program unit(s) 202 are input into translation unit 180. In an embodiment, there can be one to a number of such program units input into translation unit 180. Examples of a program unit include a program or a module, subroutine or function within a given program. In one embodiment, program unit(s) 202 are source code. The types of source code may include, but are not limited to, C, C++, Fortran, Java, Pascal, etc. However, embodiments of the present invention are not limited to program unit(s) 202 being written at the source code level. In other embodiments, such units can be at other levels, such as assembly code. Moreover, executable program unit(s) 210 that are output from linker unit 184 (which is described in more detail below) can be executed in a multi-processor shared memory environment.

In an embodiment, translation unit 180 performs a source-to-source code level transformation of program unit(s) 202 to generate translated program unit(s) 204. However, embodiments of the present invention are not so limited. For example, in another embodiment, translation unit 180 could perform a source-to-assembly code level transformation of program unit(s) 202. In an alternative embodiment, translation unit 180 could perform an assembly-to-source code level transformation of program unit(s) 202.

Compiler unit 182 receives translated program units 204 and generates object code 208. Compiler unit 182 can be different compilers for different operating systems and/or different hardware. In an embodiment, the compilation of translated program unit(s) 204 is based on the OpenMP specification.

Linker unit 184 receives object code 208 and runtime library 206 and generates executable code 210. Runtime library 206 can include one to a number of different functions or routines that are incorporated into the object code 208. In one embodiment, executable code 210 that is output from linker unit 182 can be executed in a multi-processor shared memory environment. Additionally, versions of executable program unit(s) 208 can be executed across a number of different operating system platforms, including, but not limited to, different versions of UNIX, Microsoft Windows™, real time operating systems such as VxWorks™, etc.

Figure 3A:
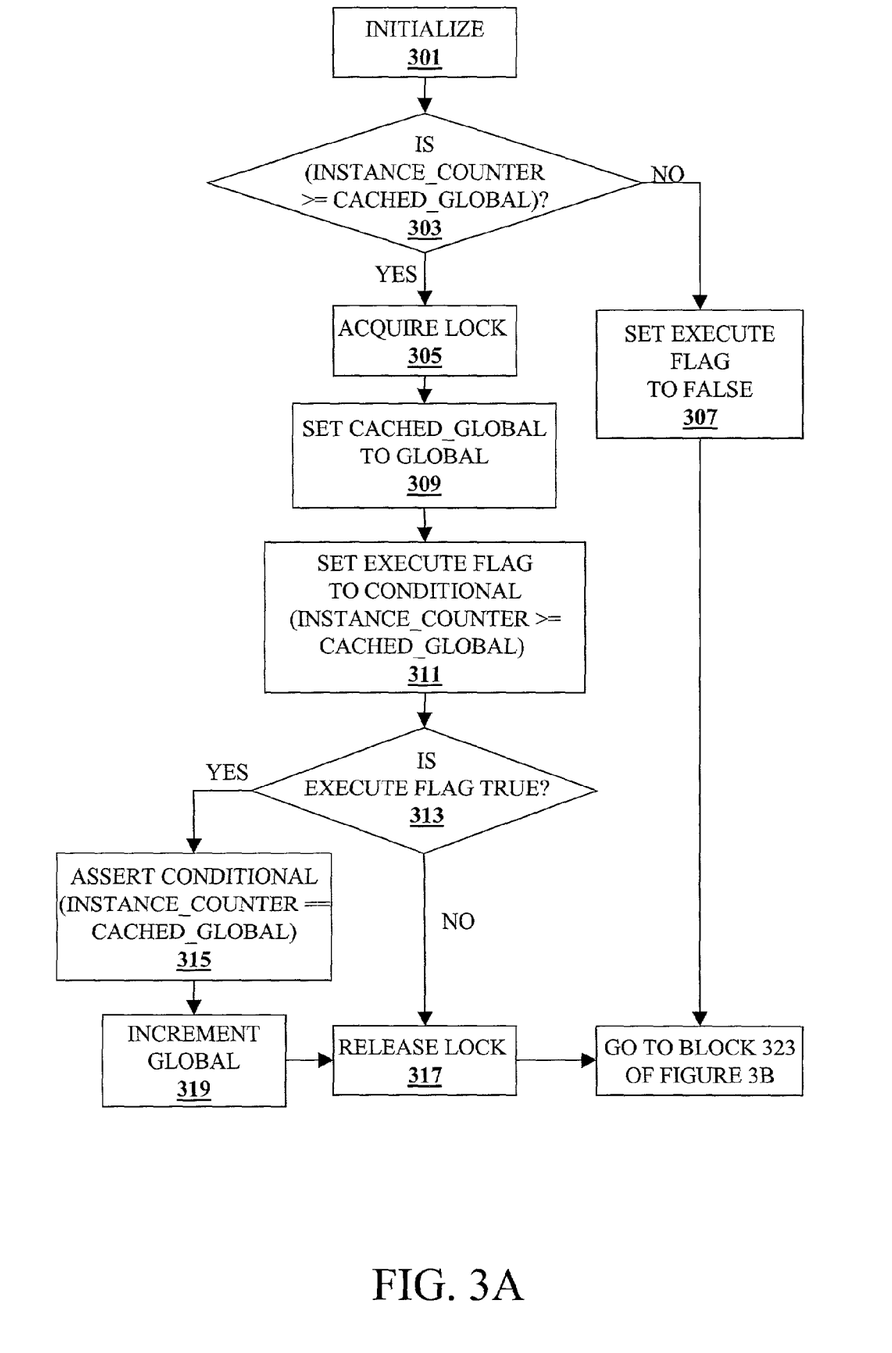
FIG. 3A is a flow chart for performing a parallel construct according to one embodiment of the invention.
Figure 3B:
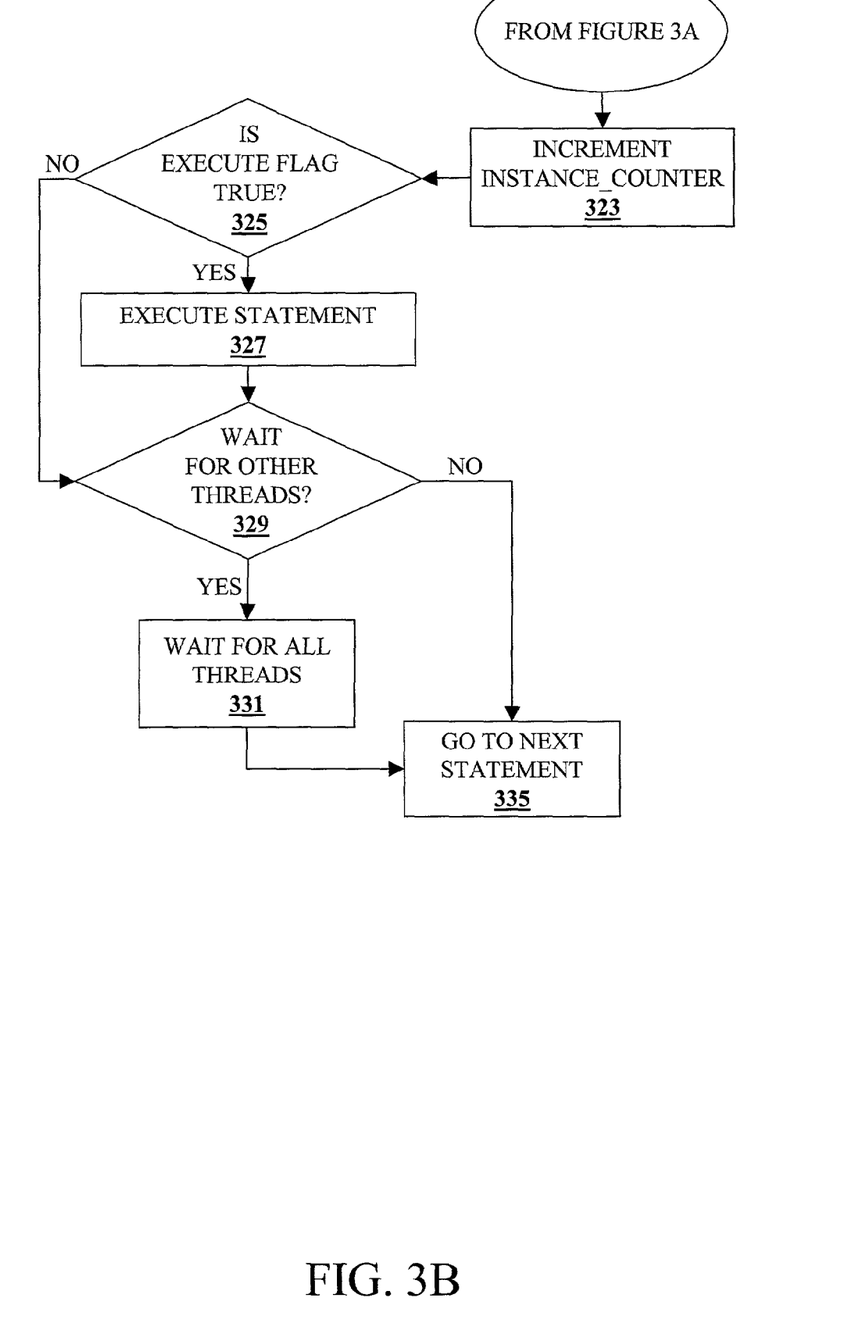
FIG. 3B is a continuation of the flow chart illustrated in FIG. 3A according to one embodiment of the invention.

FIG. 3A and FIG. 3B are flowcharts for performing a parallel construct according to one embodiment of the invention. FIG. 3A is a flow chart for performing a parallel construct according to one embodiment of the invention. At block 301, a shared value and a set of private values for a thread are initialized. This set of private values for each thread include a private value indicating a specific instance of the shared value and a private value indicating an instance of a parallel construct encountered by the thread. The private value indicating the shared value may also be considered a limit or boundary for accessing the shared value as illustrated herein. In this example, the private value indicating the instance of the parallel construct will be referred to as "INSTANCE_COUNTER". The private value indicating the shared value will be referred to as "CACHED_GLOBAL". The shared value indicates the latest instance of the parallel construct that has been encountered by any thread on this team (i.e., a thread has undertaken the associated task).

At block 303, a thread determines if its INSTANCE_COUNTER is greater than or equal to its CACHED_GLOBAL. This determination is performed to determine which instance of the parallel construct the thread is encountering. If the thread determines that its INSTANCE_COUNTER is less than its CACHED_GLOBAL, then at block 307 the thread sets an execute flag to false. The thread's INSTANCE_COUNTER is less than its CACHED_GLOBAL because the thread is at an instance prior to the latest instance than has been encountered by any thread in this team, hence the corresponding task has already been undertaken by another thread. From block 307 control flows to block 323 of FIG. 3B. Using the CACHED_GLOBAL instead of the shared value to determine the thread's location avoids unnecessary lock acquisitions and cache accesses.

If at block 303 the thread determines that its INSTANCE_COUNTER is greater than or equal to its CACHED_GLOBAL, then at block 305 the thread acquires a lock on the shared value. At block 309 the thread sets its CACHED_GLOBAL to the shared value. At block 311, the thread sets the execute flag to the result of the conditional INSTANCE_COUNTER>=CACHED_GLOBAL. This comparison is performed since the INSTANCE_COUNTER may still be less than the updated CACHED_GLOBAL. The execute flag indicates whether or not the thread is to undertake a task associated with the instance of the parallel construct.

At block 313, the thread determines if the execute flag has been set to true. If the execute flag has been set to true, then at block 315 the thread asserts the conditional INSTANCE_COUNTER==CACHED_GLOBAL, i.e., ensures that INSTANCE COUNTER equals CACHED_GLOBAL. In an alternative embodiment of the invention, the assertion is not performed because the INSTANCE_COUNTER will not be greater than a thread's CACHED_GLOBAL. At block 319, the thread increments the shared value. The shared value is incremented to indicate the thread undertaking the most current instance of the parallel construct because it is the first thread to arrive at this instance of the parallel construct. At block 317 the thread releases the lock on the shared value. If it is determined at block 313 that the execute flag is set to false, then control flows directly from block 313 to block 317. From block 317, control flows to block 323 of FIG. 3B.

FIG. 3B is a continuation of the flow chart illustrated in FIG. 3A according to one embodiment of the invention. At block 323, the thread increments its INSTANCE_COUNTER. Incrementing the INSTANCE_COUNTER indicates that the thread has encountered the instance of the parallel construct. At block 325, the thread determines if the execute flag is set to true. If the execute flag is not set to true, then at block 329 the thread determines if it must wait for other threads (e.g., the thread encounters an implicit or explicit barrier construct). If at block 325 the thread determines that the execute flag is set to true, then at block 327 the thread executes the task associated with the instance of the parallel construct. From block 327 control flows to block 329. If at block 329 the thread determines that it does not have to wait for other threads of the team (e.g., an instance of a SINGLE construct with an instance of a NOWAIT construct), then at block 335 the thread goes on to the next statement. If at block 329 the thread determines that it must wait for other threads of its team, then at block 331 the thread waits for the other threads. Control flows from block 331 to block 335.

A thread that undertakes an expensive task (i.e., a task requiring long execution time) does not repeatedly undergo a lock acquisition phase for each encountered thread after completion of the expensive task. Fewer lock acquisitions result in more efficient execution of the code. In addition, fewer lock acquisitions reduce the number of cache misses, which are expensive.

Figure 4A:
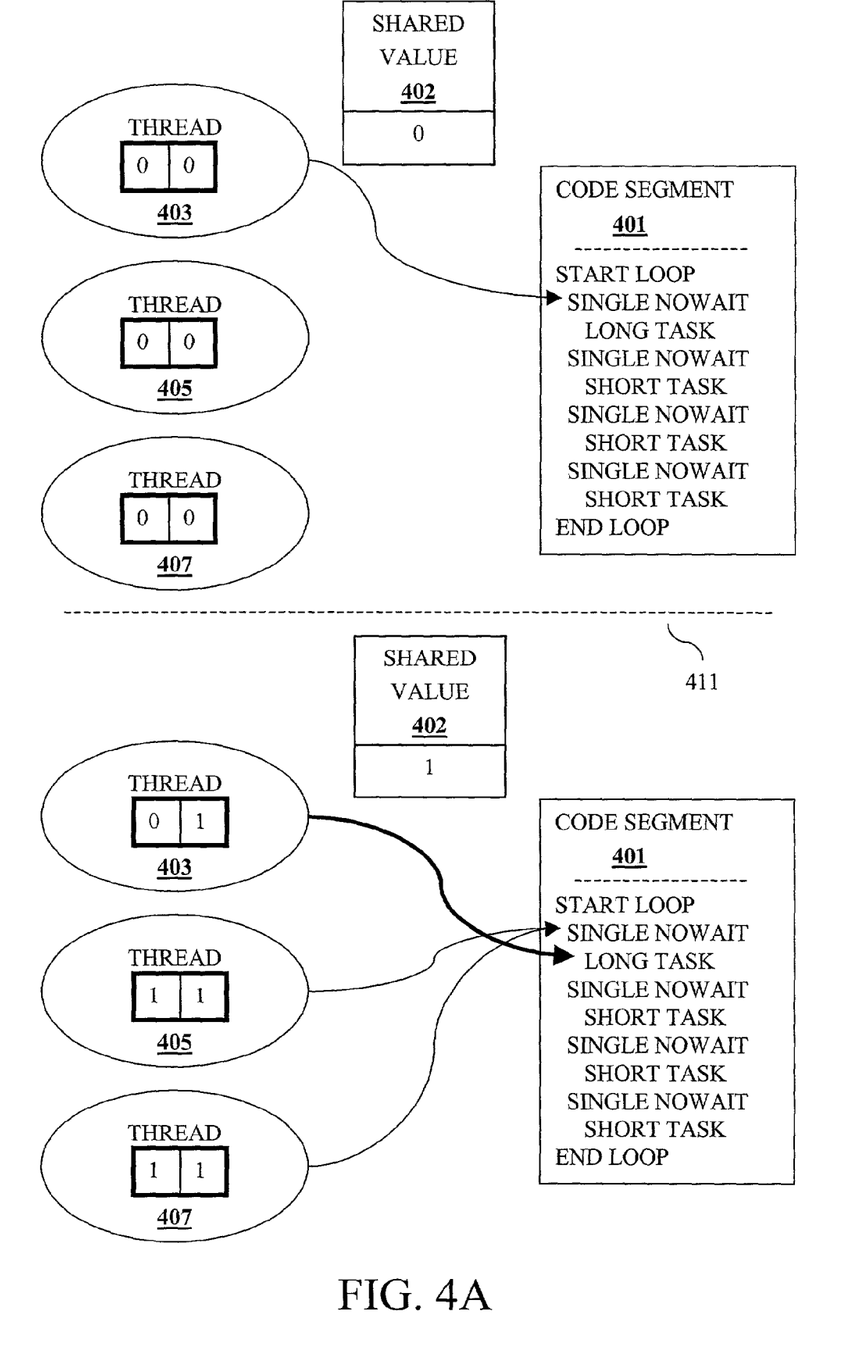
FIG. 4A is a block diagram illustrating an example of a team of threads performing a set of instances of the SINGLE construct of a code segment at a first time and a second time according to one embodiment of the invention.
Figure 4B:
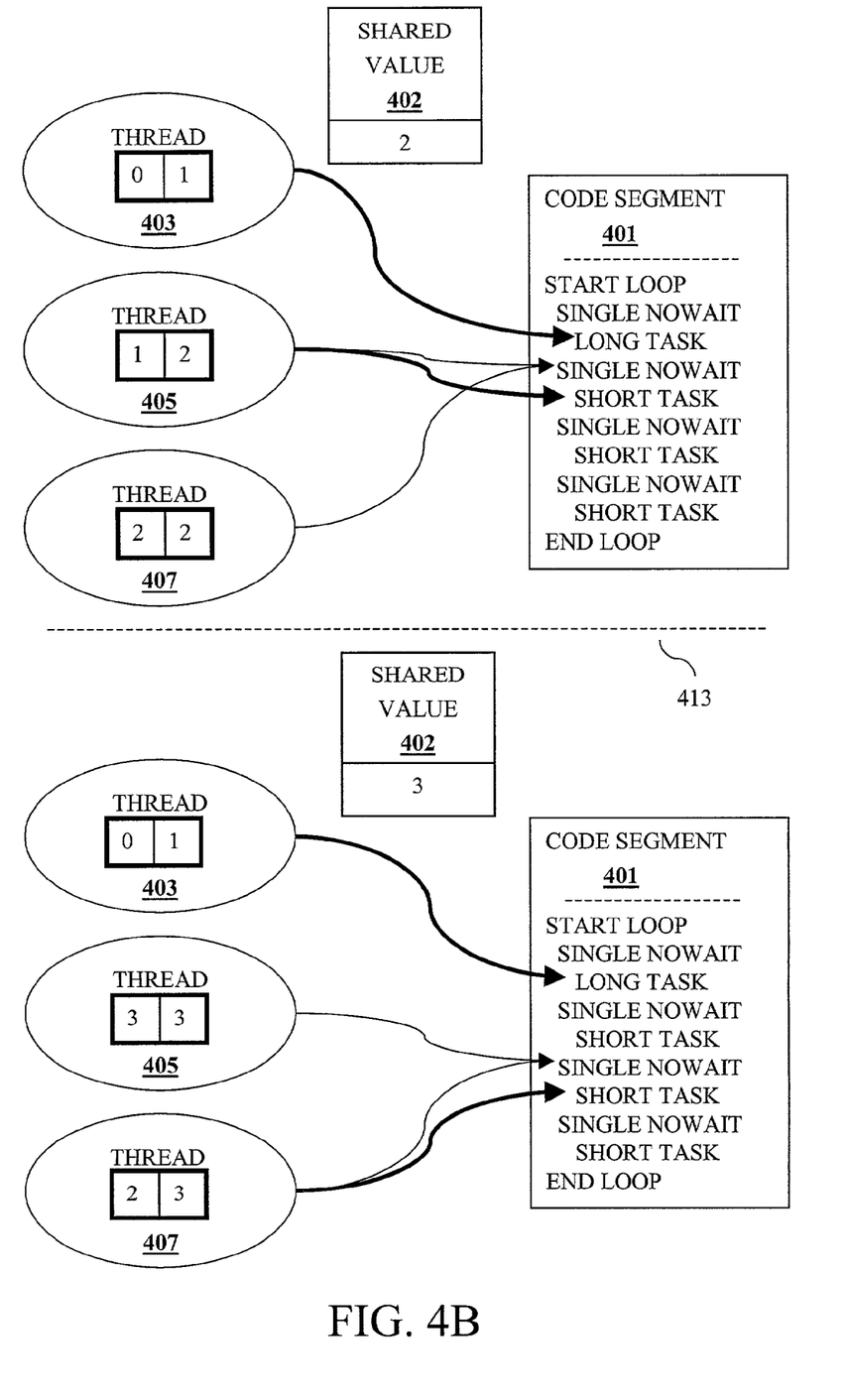
FIG. 4B is a block diagram illustrating an example of a team of threads performing a set of instances of the SINGLE construct of a code segment in a third and fourth time continued from the example of FIG. 4A according to one embodiment of the invention.
Figure 4C:
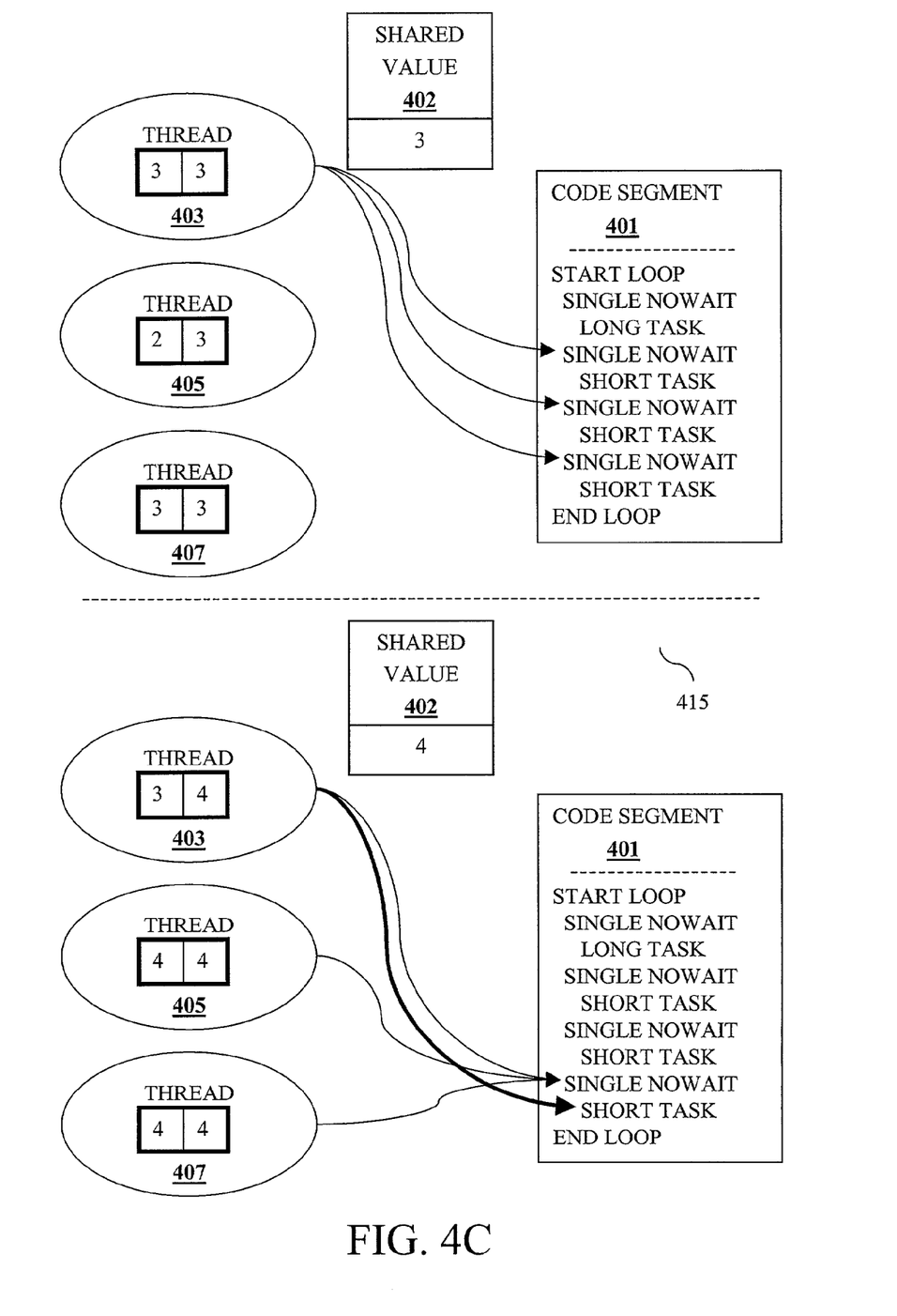
FIG. 4C is a block diagram illustrating an example of a team of threads performing a set of instances of the SINGLE construct of a code segment in a fifth and sixth time continued from the example of FIGS. 41 and 42 according to one embodiment of the invention.

FIGS. 4A–4C illustrate an example of performing a parallel code segment having a set of parallel constructs comprised of a single task according to one embodiment of the invention. FIG. 4A is a block diagram illustrating an example of a team of threads performing or executing a code (i.e., code segment 401) that includes a set of instances of the SINGLE construct at a first time and a second time according to one embodiment of the invention. In FIG. 4A, three threads, 403, 405, and 407 comprise a team of threads. A dashed line 411 separates a first time from a second time. Above the dashed line 411, a shared value 402 is set to zero. A CACHED_GLOBAL (the first number illustrated for each of the threads 403, 405, 407) and an INSTANCE_COUNTER (the second number illustrated for each of the threads 403, 405, 407) for each of the threads 403, 405, and 407 are also initialized to zero. A code segment 401 includes a loop. The loop has four instances of the SINGLE construct. Each instance of the SINGLE construct in the code segment 401 is followed by a NOWAIT construct. In addition, each instance of the SINGLE construct in the code segment 401 is associated with a task. All of the tasks are shorts tasks (i.e., inexpensive tasks) except for a long task associated with the first instance of the SINGLE construct.

Above the dashed line 411, the thread 403 encounters the first instance of the SINGLE construct. Below the dashed line 411 in a second time, the thread 403 undertakes the long task and increments the shared value and its INSTANCE_COUNTER. The threads 405 and 407 also encounter the first instance of the SINGLE construct, but do not perform the long task associated with it since the thread 403 has already undertaken it. Each of the threads 405 and 407 increment their INSTANCE_COUNTER to one and set their CACHED_GLOBAL to the shared value, which is one.

FIG. 4B is a block diagram illustrating an example of a team of threads performing a set of instances of the SINGLE construct of a code segment in a third and fourth time continued from the example of FIG. 4A, according to one embodiment of the invention. In FIG. 4B, a dashed line 413 separates a third time from a fourth time. Above the dashed line 413 in the third time, the thread 403 continues to perform the long task associated with the first instance of the SINGLE construct. While the thread 403 performs the long task, the thread 405 encounters the second instance of the SINGLE construct and undertakes the short task associated with the second instance of the SINGLE construct. The thread 405 increments the shared value to two and increments its INSTANCE_COUNTER to two. The thread 407 also encounters the second instance of the SINGLE construct, but does not perform the short task since the thread 405 has already undertaken the associated task. The thread 407 increments its INSTANCE_COUNTER to two and sets its CACHED_GLOBAL to the shared value, which is two.

Below the dashed line 413 in the fourth time, the thread 403 continues to perform the long task associated with the first instance of the SINGLE construct. The thread 407 encounters a third instance of the SINGLE construct. The thread 407 increments the shared value 402 and its single INSTANCE_COUNTER to three. The thread 407 then undertakes the short task associated with the third instance of the SINGLE construct. The thread 405 also encounters the third instance of the SINGLE construct, but does not perform the short task associated with the third instance of the SINGLE construct since the thread 407 is performing the short task. The thread 405 increments its INSTANCE_COUNTER to three and sets its CACHED_GLOBAL to the shared value 402, which is three.

FIG. 4C is a block diagram illustrating an example of a team of threads performing a set of instances of the SINGLE construct of a code segment in a fifth and sixth time, continued from the example of FIGS. 4A and 4A according to one embodiment of the invention. In FIG. 4C, a dashed line 415 separates a fifth time from a sixth time. Above the dashed line 415 in the fifth time, the thread 403 has completed performing the long task associated with the first instance of the SINGLE construct. The thread 403 then encounters the second instance of the SINGLE construct, the third instance of the SINGLE construct, and the fourth instance of the SINGLE construct. When the thread 403 encounters the second instance of the SINGLE construct, the thread 403 sets its CACHED_GLOBAL to the shared value 402, which is three. The thread 403 then increments its single INSTANCE_COUNTER for each instance of the SINGLE construct it encounters. When the thread 403 encounters the second and third instance of the SINGLE construct, the thread 403 does not perform the tasks associated with these instances. The thread 403 does not undertake the tasks associated with the second and third instances of the SINGLE construct since its INSTANCE_COUNTER being less than the CACHED_GLOBAL indicates that another thread has already undertaken these tasks. When the thread 403 encounters the fourth instance of the SINGLE construct, its CACHED_GLOBAL and its INSTANCE_COUNTER are equal.

Below the dashed line 415 at the sixth time, the thread 403 increments the shared value 402 and its INSTANCE_COUNTER to four, indicating the fourth instance of the SINGLE construct to be encountered. The thread 403 then undertakes the short task associated with the fourth instance of the SINGLE construct. The threads 405 and 407 subsequently encounter the fourth instance of the SINGLE construct, but do not perform the short task associated with the fourth instance of the SINGLE construct. The threads 405 and 407 individually set their CACHED_GLOBAL to the shared value 402 and increment their INSTANCE_COUNTER.

In the example illustrated by FIGS. 4A–4C, thread 403 accesses the shared value 402 three times. The thread 405 and the thread 407 access the shared value 402 four times each. A total of 11 lock acquisitions occur in the illustration. Each time the shared value 402 is accessed, the thread 403, 405 or 407 acquires a lock on the shared value. Previous implementations of parallel constructs would allocate a data structure for each instance of the parallel construct to be accessed by each thread of the team. Such previous implementations would require 12 lock acquisitions. Even in this simple illustration with a small number of threads, a small number of tasks and only one expensive task, the number of lock acquisitions has decreased. The number of avoided lock acquisitions increases in relation to the complexity of tasks, number of tasks, and number of threads. In addition, the number of potential cache misses decreases in relation to the reduction of lock acquisitions.

Furthermore, the lock acquisition is for a short time (i.e., long enough to set a thread's CACHED_GLOBAL to the shared value and possibly increment the shared value). In previous implementations, a thread would have to hold a lock while communicating with other threads to determine whether or not to undertake the associated task. With the embodiments of the present invention, a thread is implicitly informed by the shared value whether or not another thread has undertaken the task.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. An apparatus comprising:
   a memory to store a code segment, the code segment having a set of instances of a parallel construct, each instance associated with a task; and
   a set of processors coupled to the memory, the set of processors to process the code segment, to encounter one instance while processing the code segment, to generate a second code segment corresponding to the instance, the second code segment comprising a plurality of threads
   a first thread that when executed to determine if the task associated with the one instance has been undertaken by another thread by comparing a first private value of the first thread and a second private value of the first thread,
   if the task has not been undertaken by the other thread, to undertake the task and to indicate with a shared value the undertaking of the task, and
   to indicate with the first private value the instance.

2. The apparatus of claim 1 further comprising the set of processors to maintain the second private value, the second private value being a boundary to access the shared value.

3. A system comprising:
   a translating unit to translate a code, the code having an instance of a parallel construct, the instance associated with a task, the translating unit to generate a code segment:
   the code segment when executed to cause each of a plurality of threads: to determine if the task has been undertaken by another thread by comparing a first private value of the thread with a second private value of the thread,
   if the task has not been undertaken by another thread, to undertake the task and to indicate with a shared value the undertaking of the task, and
   to indicate with the first private value the instance;
   a linker unit coupled to the translating unit, the linker unit to link the translated code with a library; and
   a set of processors coupled to the translating unit and the linker unit, the set of processors to host the plurality of threads.

4. The system of claim 3 wherein to determine if the task has been undertaken by the other thread comprises a comparison of the first private value with the shared value.

5. The system of claim 3 wherein the code segment to cause each of the set of threads to perform operations further comprising to maintain the second private value, the second private value being a boundary for the second private value's corresponding one of the set of threads to access the shared value.

6. A machine-accessible medium containing instructions that, when executed, cause a machine to:
receive a first code segment, the first code segment having a set of instances of a parallel construct, each of the instances comprised of a task; and
transforming the first code segment to a second code segment,
the second code segment that when executed: to initialize a shared value for each of a team of threads, the shared value to indicate a most current instance encountered by one of the threads,
to initialize a first private value and a second private value for each thread, the first private value to indicate one of the instances encountered by the first private value's corresponding thread,
to determine if the task of the most current instance has been undertaken by comparing a first private value of the first thread and a second private value of the first thread,
upon determining the task has not been undertaken, undertaking the task and indicating with the shared value the undertaking of the task,
to update the shared value with the team of threads, and
to update the private value of each of the team of threads with the private value's corresponding thread.

7. The machine-accessible medium of claim 6 wherein update the shared value comprises incrementing the shared value when one of the threads undertakes the task of one instance.

8. The machine-accessible medium of claim 6 wherein update the private value comprises incrementing the private value when the private value's corresponding thread encounters one instance.

9. The machine-accessible medium of claim 6 further comprising instructions that, when executed, cause a machine to:
update the second private value for each of the team of threads, the second private value being a boundary for accessing the shared value.

10. A machine-accessible medium containing instructions that, when executed, cause a machine to:
receive a first code segment, the first code segment having a set of instances of a parallel construct, each of the set of instances being associated with a task; and
for each instance, to generate a second code segment, the second code segment that when executed to:
encounter one instance,
determine if the task of the one instance has been undertaken by comparing a first private value of the first thread and a second private value of the first thread,
upon determining the task has not been undertaken, undertaking the task and using a shared value to indicate the undertaking of the task,
using the first private value of the first thread to indicate the one instance, and
maintain the second private value of the first thread, the second private value being a boundary for accessing the shared value.

11. The machine-accessible medium of claim 10 wherein determining if the task of the one instance has been undertaken by the second thread comprises the first thread comparing the shared value and its first private value.

12. The machine-accessible medium of claim 10 further comprising the second thread maintaining a third private value and a fourth private value, the third private value to indicate a second one of the set of instances encountered by the second thread and the fourth private value to indicate the second thread's boundary for accessing the shared value.

* * * * *